United States Patent Office 3,420,339
Patented Jan. 7, 1969

3,420,339
BRAKE RIGGING FOR A THREE-BOGIE COMPOSITE RAILWAY CAR
Zaven Oganezovich Karakashian, ulitsa Dobroljubova 18, kv. 46; Vladimir Ivanovich Lariokhin, Malaya Naberezhnaya 15, kv. 8; and Valentin Mikhailovich Kazakov, stantsia Ozherelie Moskovskoi zheleznoi dorogi, ulitsa Klubnaya 3, kv. 8, all of Moscow, U.S.S.R.
Filed June 2, 1967, Ser. No. 643,204
U.S. Cl. 188—47      2 Claims
Int. Cl. B61h 13/00

The present invention relates to the field of transportation means and, more particularly, to brake rigging for a three-bogie composite railway car, such as a composite tank car.

Known in the art are brake riggings for composite railway cars wherein the force from one air brake cylinder rod is transmitted to brake shoes of only one or of an even number of car bogies.

A disadvantage of said brake riggings lies in the fact that they cannot be employed for transmitting the force from one brake cylinder to brake shoes of three bogies of a composite car simultaneously.

The primary object of the present invention is to eliminate the above-mentioned disadvantage.

The primary object of the present invention is to provide a brake rigging for a three-bogie composite railway car, said brake rigging being capable of transmitting the force from one brake cylinder to the brake shoes of three bogies of a composite car simultaneously. This object may be achieved through the use of a brake rigging for a three-bogie composite railway car wherein one of the horizontal levers is articulated to an air brake cylinder rod and to a lever rod of one of the car bogies, while through a bracing member said horizontal lever is movably connected to the second horizontal lever situated on the side of the brake cylinder rear cover and in its turn is articulated to the lever rod of the second bogie. According to the invention, articulated to the brake cylinder rear cover is one end of a guide bar, whereas the other end of said bar is articulated to a horizontal lever which is capable of transmitting the force from the brake cylinder rod to the brake shoes of the third bogie, the most removed from the brake cylinder. The second horizontal lever of said bogie, being connected to the first one by means of the bracing member, is articulated to a movable lever rod, which is in turn connected to the horizontal lever situated on the side of the brake cylinder rear cover.

It is expedient that the guide bar be made in the form of a tube with a movable rod moving therein, and that windows be provided in the tube to connect said lever rod to the horizontal levers.

An exemplary embodiment of the present invention is shown in the drawings, wherein.

Figure 1:
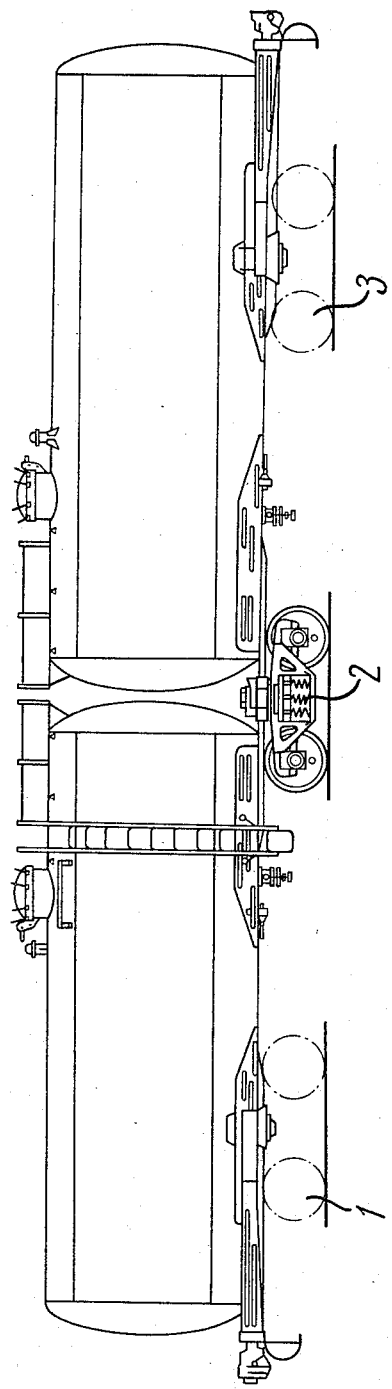
FIGURE 1 is a general schematic view of a three-bogie composite railway tank car.
Figure 2:
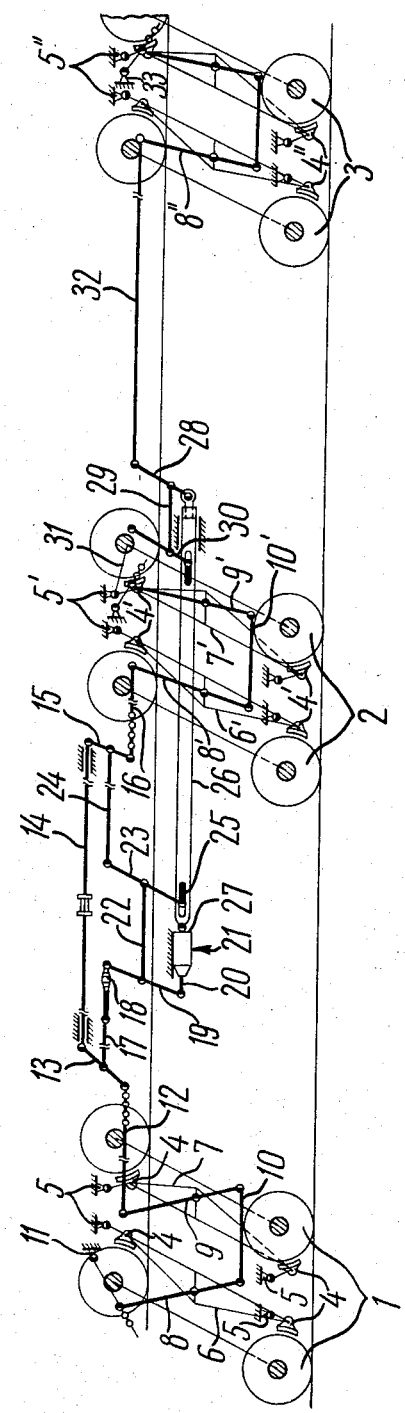
FIGURE 2 is a general view of a brake rigging for the tank car of FIG. 1.

Referring to the drawings, the composite railway tank car consists of two tanks resting upon three biaxial bogies 1, 2 and 3, one of which, the middle bogie 2, is common to both tanks of the tank car.

The brake rigging of each bogie comprises brake shoe holders 4 with brake shoes fastened thereon (brake shoe holders 4' are for the bogie 2, brake shoe holders 4" are for the bogie 3, respectively; further on, the reference number marked (') will refer to the bogie 2, and the reference numbers marked (") will refer to the bogie 3).

Brake shoe holders 4, 4', 4" are suspended to brackets 5, 5', 5" by means of articulated joints, said brackets being fastened on longitudinal bars of the bogies 1, 2 and 3 frames (frame bars are not shown in the drawings), and are coupled with brake beam 6, 6', 6" and 7, 7', 7", which are in turn articulated to vertical levers 8, 8', 8" and 9, 9', 9". The lower ends of said levers are articulated by means of struts 10, 10', 10".

The upper end of vertical lever 8 is articulated to a bracket 11 fastened on a spring bolster of bogie 1 (not shown in the drawing), whereas the upper end of vertical lever 9 by means of a lever rod 12 is articulated to the arm of an auxiliary horizontal lever 13, whose other arm is connected to one of the ends of a rod bar 14 which is connected to an arm of the second auxiliary horizontal lever 15.

The other arm of lever 15 by means of a lever rod 16 is movably connected to the upper end of vertical lever 8' of bogie 2.

The midpoint of horizontal lever 13 through an automatic regulator 18 and by means of a lever rod 17 is movably connected to an arm of a horizontal lever 19, whose other arm of which is articulated to a rod 20 of an air brake cylinder 21 held in position on a bracket provided on the bottom of the left-hand tank of the tank car.

Horizontal lever 19 by means of a bracing member 22 is articulated to another horizontal lever 23, whose one arm is likewise articulated to lever 15 by means of a lever rod 24, whereas the other arm is articulated to one of the ends of a lever rod 25, capable of moving inside a hollow guide bar 26.

Said guide bar 26 is articulated to a rear cover 27 of brake cylinder 21 with one of its ends, while the arm of a horizontal lever 28 is articulated to the other end of guide bar 26, said horizontal lever 28 being connected by means of a bracing member 29 to another horizontal lever 30, whose one arm is connected to one of the ends of lever rod 25, and the other arm is connected to a bracket 31 fastened to a spring bolster of bogie 2 (not shown in the drawing).

The connection of lever rod 25 to horizontal levers 23 and 30 is effected through windows made in tubular guide bar 26.

Horizontal lever 28 with its second arm and via lever rod 32 is connected to the upper end of vertical lever 8" of bogie 3, whereas the upper end of second vertical lever 9" of said bogie is articulated to a bracket 33 fastened to the spring bolster of bogie 3.

The proposed brake rigging operates as follows.

During the braking the force from rod 20 of brake cylinder 21 is transmitted simultaneously to the brake shoes of all three bogies 1, 2 and 3.

The force from rod 20 is transmitted to the brake shoes of bogie 1 through horizontal lever 19, automatic regulator 18, lever rod 17, lever 13 and lever rod 12 to vertical levers 9 and 8, and therefrom to brake beams 7 and 6 connected to brake shoe holders 4 whereon the brake shoes are fastened.

The force from lever 19 is transmitted to the brake shoes of bogie 2 through bracing member 22, lever 23, lever rod 24, lever 15, lever rod 16 to vertical levers 8' and 9' of bogie 2, and therefrom to brake beams 6' and 7' connected to brake shoe holders 4', whereon the brake shoes are fastened.

The force from rod 20 is transmitted to the brake shoes of bogie 3 through lever 23, lever rod 25, lever 30, bracing member 29, lever 28, lever rod 32 to vertical levers 8" and 9" of bogie 3, and therefrom to brake beams 6" and 7" connected with brake shoe holders 4", whereon the brake shoes are fastened.

Availability of auxiliary horizontal levers 13 and 15 interconnected by means of rod bar 14 which is fastened on the left-hand tank of the tank car makes it possible, with the given ratio of the arms of the vertical levers, to employ one automatic regulator 18 which provides for adjusting the clearances between the bogie wheels and brake shoes within the assigned limits up to the maximum permissible wear of the brake shoes proper and the elements of the brake rigging articulated joints, as well.

What is claimed is:

1. A brake rigging for a three-bogie composites railway car, preferably for a tank car, comprising: brake shoes for composite railway car bogies; an air brake cylinder; a leverage capable of transmitting the force from the rod of said air brake cylinder to said bogie brake shoes; the first horizontal lever of said leverage articulated to the rod of said brake cylinder and to the lever rod of one of said bogies; the second horizontal lever of said leverage movably connected through a bracing member to said first horizontal lever and to the lever rod of the second bogie, said second horizontal lever being situated on the side of a rear cover of said brake cylinder; a guide bar, whose one end is articulated to said brake cylinder rear cover; a horizontal lever articulated to the other end of said guide bar and being capable of transmitting the force to brake shoes of the third bogie, which is the most removed from said brake cylinder; the second horizontal lever of said third bogie coupled through a bracing member with said first horizontal lever of said bogie; a movable lever rod articulated to said first horizontal lever of the third bogie and to said horizontal lever situated on the side of the brake cylinder rear cover.

2. A brake rigging as claimed in claim 1, wherein said guide bar is essentially a tube with said movable lever rod running therein, windows being provided in the tube to connect said movable lever rod to said horizontal levers.

References Cited

UNITED STATES PATENTS

| 1,612,781 | 12/1926 | Sauvage | 188—197 X |
| 1,750,566 | 3/1930 | Browall | 188—47 |

DUANE A. REGER, *Primary Examiner.*

U.S. Cl. X.R.

188—197